Feb. 4, 1941. E. C. HORTON 2,230,596
WINDSHIELD CLEANER
Filed Jan. 11, 1938
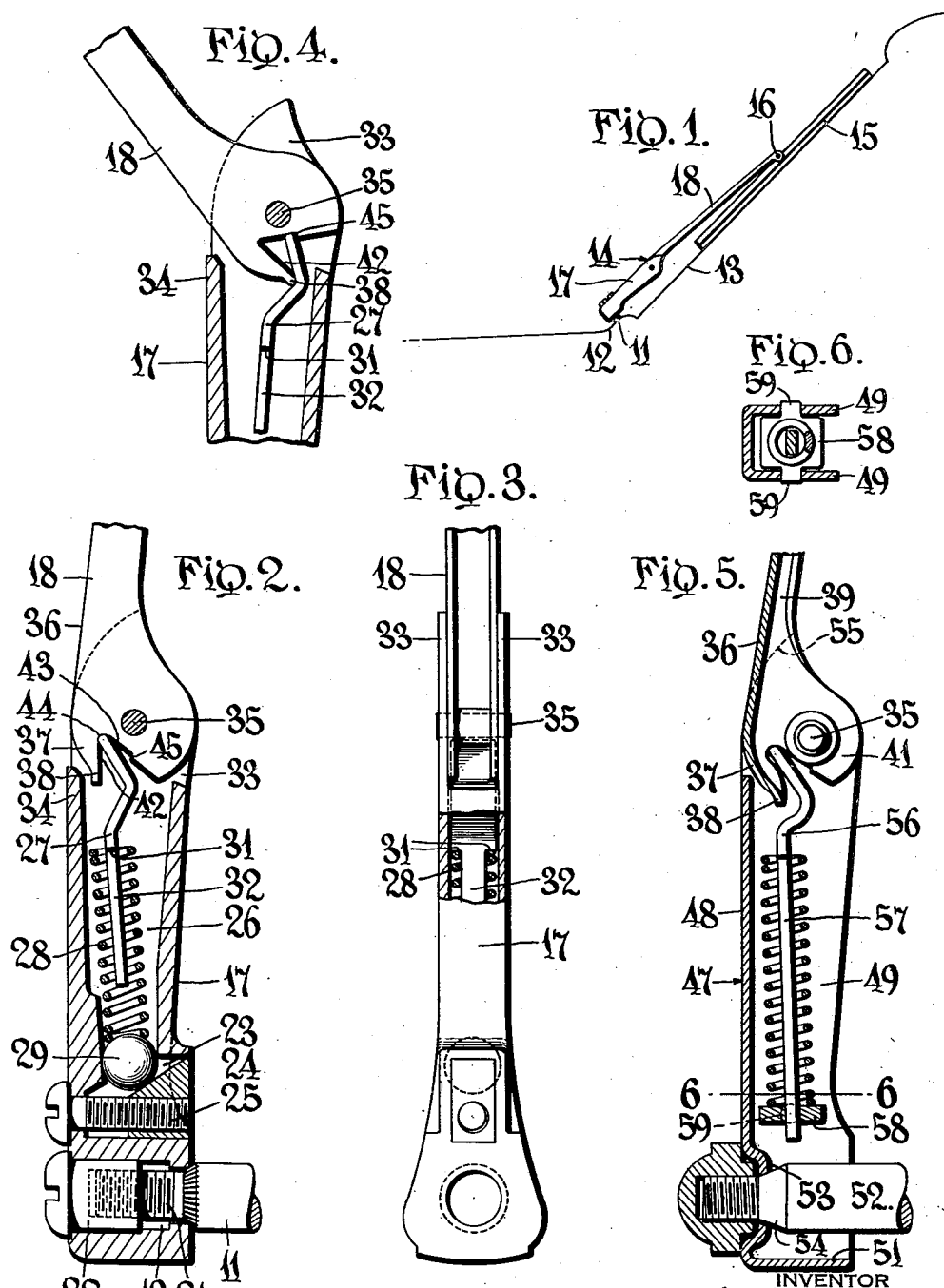
INVENTOR
Erwin C. Horton,
BY
Beau, Brooks, Buckley + Beau.
ATTORNEYS Patented Feb. 4, 1941

2,230,596

UNITED STATES PATENT OFFICE 2,230,596

WINDSHIELD CLEANER

Erwin C. Horton, Hamburg, N. Y., assignor to Trico Products Corporation, Buffalo, N. Y.

Application January 11, 1938, Serial No. 184,453

11 Claims. (Cl. 15—255)

The present invention relates to windshield cleaners for motor vehicles and the like and particularly to an improved arm for supporting and for carrying a wiper blade across the windshield glass or similar surface.

The invention contemplates a wiper blade carrying arm having a part carried by or upon a rock shaft and a second part carrying the blade and pivoted to the first part; and a simple and improved means, including a resilient element for urging the second part about the axis of the pivot toward the windshield glass. The means referred to may be adjustable to vary the pressure with which the blade will be pressed against the windshield glass, and is arranged so that the second part and the blade may be moved about the pivot axis away from the glass and automatically retained in such position.

These and other objects and advantages will become apparent from the following description of the typical embodiments of my invention shown in the accompanying drawing, wherein:

Fig. 1 is a side elevation of a windshield wiper arm and blade assembly incorporating the invention and mounted upon an automobile;

Fig. 2 is a longitudinal sectional view of a portion of the arm shown in Fig. 1;

Fig. 3 is an elevational view, with parts broken away and appearing in section, looking at the device at approximately a right angle to Fig. 2;

Fig. 4 is a fragmentary view, similar to Fig. 2 showing the wiper carrying part of the arm in a non-operating position;

Fig. 5 is a view like Fig. 2, but illustrating a modified or alternative form of device; and Fig. 6 is a sectional view taken along line 6—6 of Fig. 5.

As shown in Fig. 1 the windshield cleaner may include a shaft 11 extending from a portion 12 of the vehicle beneath the windshield 13 thereof, the shaft being oscillated about its axis by a motor or other drive device (not shown). The shaft carries an arm 14 having a wiper blade 15 attached to its outer end 16 in any suitable manner so that as the shaft and arm oscillate about the shaft axis the blade will be carried over the surface of the windshield glass.

The arm 14 comprises a section 17 secured to the shaft 11 and a section 18 that has the blade attaching portion 16.

In the form of the invention illustrated in Figs. 2, 3 and 4, section 17 may be a die-casting having an opening 19 receiving the threaded end portion 21 of shaft 11, and also receiving with a comparatively snug fit fastener 22 which is threaded to end portion 21. Formed in the section 17 substantially parallel to shaft 11 is a guide opening 23, slidingly receiving a wedge block 24 threaded to screw 25, the latter extending longitudinally of guide opening 23.

Opening 23 communicates with a radially extending opening 26 in the section 17 and in which is an actuating rod 27, spring 28 and ball 29. The rod 27 has shoulders 31 engaging one end of the spring and a portion 32 within the spring, while the ball 29 engages the opposite end of the spring.

The side wall portions 33 of section 17 extend beyond the front wall 34 in the direction radially of shaft 11 and support pivot pin 35 which carries the outer or blade section 18 of the arm. The latter, or blade section, is of channel formation, with its front wall 36 terminating in a portion 37 that is curved about the axis of the pivot pin 35 and has a finger 38 at its end.

The side walls or flanges 39 of section 18 have enlargements 41 adjacent the pivot pin that have notches 42 formed therein for receiving the outer end of the rod 27.

As shown in Fig. 2 the rod engages the edge 43 of the notch 42 adjacent the forward end 44 thereof, so that the pressure of spring 28 is applied to the wiper section 18 of the arm forwardly of the pivot pin 35, urging the wiper blade carrying end of the section toward the windshield glass to maintain wiping pressure.

When section 18 is manually moved forwardly or counterclockwise about pivot 35 in Figs. 1, 2 and 4, to remove the wiper blade from the glass, as to permit washing of the latter, the spring 28 is compressed until finger 38 engages rod 27 and shifts it manually, to the position shown in Fig. 4, the lower end of the spring pivoting above the ball 29. During the shifting movement the rod slides along edge 43 of the notch 42 until it abuts shoulder 45 which is located to the rear of the pivot pin. Thereupon the pressure of spring 28 is applied to the wiper section 18 of the arm rearwardly of the pivot pin, maintaining the parts in the non-operating position shown in Fig. 4.

It will be understood that turning screw 25 will cause wedge block 24 to be moved toward or away from the front wall of section 17, moving the ball 29 to either increase or decrease compression of spring 28, and thereby increase or decrease the pressure of wiping contact of the blade 15 upon the glass 13 in operation of the cleaner.

It will also be understood that the assembly including spring 28 and rod 27 constitutes resilient means engaging the arm section 18 on one or the other side of the axis of pivot pin 35, thereby urging the arm section either toward the windshield, as in Fig. 2, or away from the windshield as in Fig. 4.

In the embodiment of my invention illustrated in Fig. 5 of the drawing, the shaft section 47 of the wiper arm is formed of sheet metal, with a front wall 48, and flanges forming side walls 49 and end wall 51 adjacent the shaft 52. The latter is threaded at its end, the front wall 48 having a recessed apertured portion 53 which holds seated a cap nut threaded to the shaft upon a tapered portion 54 of the shaft. Side walls 49 are extended as indicated at 55 to form bearing or supporting parts for the pivot pin 35. A rod 56, similar to rod 27 in the first described embodiment, has its reduced shank 57 extended through a coiled compression spring and also extends slidably through an opening in a block 58 upon which the spring bears. The plate 58 has trunnions 59 on its opposite sides extending through bearing apertures in side walls 49. Operation of the device is similar to that heretofore described, although means are not provided to vary the compression of the spring. During shifting of the rod, the rod and spring assembly pivots with block 58 about the axis of trunnions 59.

It will be understood that in both forms of the invention the spring and actuating means are housed and concealed by the formation of the shaft section of the arm. The curved form of wall portion 37 of the wiper section of the arm enables a relatively close fit with the adjacent front wall of the shaft section of the arm while also permitting relative movement of the two arm sections, and lends to the device a substantially continuous frontal appearance.

It will be further understood that the devices herein shown and described are merely illustrative of the principles involved, which may be embodied in other physical forms without departing from the scope or spirit of this invention.

I claim:

1. In a windshield wiper arm, two sections having an articulated connection, spring means associated with the two sections and acting thereon for urging relative movement thereof for maintaining wiping pressure, said spring means being carried by one section, and a wedge carried by said one section and backing the spring means, said wedge being adjustable upon said one section for varying the pressure of said spring means.

2. In a windshield wiper arm, two sections having an articulated connection, a spring housed within one section for urging relative movement of the other section for maintaining wiping pressure, a member movable in said one section in the direction of deformation of said spring for varying the degree of deformation thereof, a wedge engaging said member, and screwthreaded means for adjusting said wedge relative to said one section for moving said member.

3. In a windshield wiper arm, two sections having an articulated connection, a coiled spring carried by one section for urging relative movement of the other section for maintaining wiping pressure, a ball supporting one end of said spring and movable relatively to said one section in the direction of compression of said spring, and means for adjusting the position of said ball for varying the compression of the spring.

4. In a windshield wiper arm, two sections having an articulated connection, means including a coiled spring for urging movement of one relative to the other section for maintaining wiping contact, a ball supporting one end of the spring and movable relatively to said other section in the direction of compression of said spring, a member engaging said ball, and screw means for varying the position of said member to move the ball.

5. In a windshield wiper arm, two sections having an articulated connection, a member carried by one section and engaging a seat on the other section at a point disposed to one side of said connection, a resilient element associated with said member for pressing it against said other section, and said other section having a finger for shifting the member upon said seat to another position thereon at a point disposed to the other side of said connection when the sections are relatively moved through a given angle oppositely to the direction normally urged by said resilient element.

6. In a windshield wiper arm, two sections pivoted together, resilient means carried by one section and normally engaging a seat on the other section for urging relative movement of said sections in one direction about said axis, and said other section having means for shifting said resilient means upon said seat to another position thereon upon relative movement of said sections to a predetermined position, to cause the resilient means to urge relative movement of the sections in the opposite direction.

7. In a windshield wiper arm, two sections pivoted together, resilient means carried by one section and normally engaging a seat on the other section on one side of the pivot axis for urging relative movement of said sections in one direction about said axis, said other section having means for shifting said resilient means upon said seat to another position thereon and on the opposite side of the pivot axis upon predetermined relative movement of said sections in a direction opposite to said one direction, and means for limiting said shifting of the resilient means.

8. In a windshield wiper arm, two sections connected by pivot means, resilient means having one end pivotally engaging one section and having its opposite end normally engaging the other section on one side of a line between the pivot means and the pivoted end of the resilient means for maintaining wiping contact, said resilient means being shiftable about the pivotally engaging end thereof to cause said opposite end thereof to move relative to said other section across said line to engage said other section at another point thereon and on the other side of said line, and means for limiting said shifting of the resilient means.

9. In a windshield wiper arm, two sections connected by pivot means, resilient means having one end engaging and adapted to shift upon one section, a member pivoted to the other section and supporting the opposite end of said resilient means, said resilient means being shiftable about the pivot axis of said member to shift said one end thereof upon said one section from a position on one side of a line between the axis of the pivot means and said opposite end of said resilient means to a position on the other side of said line.

10. In a windshield wiper arm, two sections connected by pivot means, resilient means engaging said sections for urging relative movement of them about said pivot means, and means on one of said sections engageable with the resilient means for shifting the latter relative to one section to move the point of engagement therewith from a position on one side of a line between the pivot means and the point of engagement of the resilient means with the other section, to a position on the other side of said line.

11. In a windshield wiper arm, two sections connected by pivot means, resilient means engaging said sections for urging relative movement of them about said pivot means, and means for shifting the resilient means relative to one section to move the point of engagement therewith from a position on one side of a line between the pivot means and the point of engagement of the resilient means with the other section, to a position on the other side of said line, said means for shifting comprising a finger on said one section engageable with said resilient means at a point on the latter spaced from its point of engagement with said one section.

ERWIN C. HORTON.